(12) United States Patent
Dondi

(10) Patent No.: US 10,246,147 B2
(45) Date of Patent: Apr. 2, 2019

(54) INDUSTRIAL VEHICLE WITH DEVICE FOR RELEASING THE UNDERCARRIAGES WITHOUT DISCONNECTING THE HYDRAULIC SYSTEM

(71) Applicant: SCAIP S.R.L., Parma (IT)

(72) Inventor: Gian Paolo Dondi, Parma (IT)

(73) Assignee: SCAIP S.P.A., Parma (IT)

( * ) Notice: Subject to any disclaimer, the term of this patent is extended or adjusted under 35 U.S.C. 154(b) by 0 days.

(21) Appl. No.: 15/249,731

(22) Filed: Aug. 29, 2016

(65) Prior Publication Data

US 2017/0057570 A1 Mar. 2, 2017

(30) Foreign Application Priority Data

Aug. 27, 2015 (IT) ........................ 102015000046891

(51) Int. Cl.
| | |
|---|---|
| *B62D 55/08* | (2006.01) |
| *B62D 55/084* | (2006.01) |
| *B66C 23/36* | (2006.01) |
| *B60K 17/04* | (2006.01) |
| *F16H 57/025* | (2012.01) |
| *B62D 55/125* | (2006.01) |

(52) U.S. Cl.
CPC .......... *B62D 55/084* (2013.01); *B60K 17/046* (2013.01); *B62D 55/125* (2013.01); *B66C 23/365* (2013.01); *F16H 57/025* (2013.01)

(58) Field of Classification Search
CPC ...... B62D 55/084; B62D 55/08; B62D 55/00; B62D 55/04; B66C 23/365; B60K 17/046
See application file for complete search history.

(56) References Cited

U.S. PATENT DOCUMENTS

| | | | | |
|---|---|---|---|---|
| 3,459,070 A | * | 8/1969 | Holdeman | ........... B60K 17/046 475/337 |
| 3,674,105 A | | 7/1972 | Egli | |
| 3,686,978 A | * | 8/1972 | Knoblach | ........... B60K 17/046 475/296 |

(Continued)

FOREIGN PATENT DOCUMENTS

EP 0869051 A1 10/1998

OTHER PUBLICATIONS

European Search Report, dated Jan. 16, 2017, from corresponding European Patent Application No. EP16186139.

(Continued)

*Primary Examiner* — Kevin Hurley
*Assistant Examiner* — Michael R Stabley
(74) *Attorney, Agent, or Firm* — Young & Thompson

(57) ABSTRACT

An industrial vehicle includes at least a structure 1 with the chassis 3 and a pair of crawler undercarriages 2 each of which is driven by a hydraulic motor 5 which transmits the motion and the engine torque to a planetary gear unit 6 on which is keyed a drive wheel 4. The hydraulic motor 5 and the reduction gear 6 are not directly connected, but between them is interposed a transmission device 10. During the detachment operation of the crawler undercarriage 2 from the chassis 3, the hydraulic motor 5 is released from the device of transmission 10 and remains attached to the chassis 3, preserving its hydraulic connections, while the planetary gear unit 6 and the transmission device 10 remain fixed to the undercarriage 2.

12 Claims, 4 Drawing Sheets

(56) References Cited

U.S. PATENT DOCUMENTS

Figure 3:
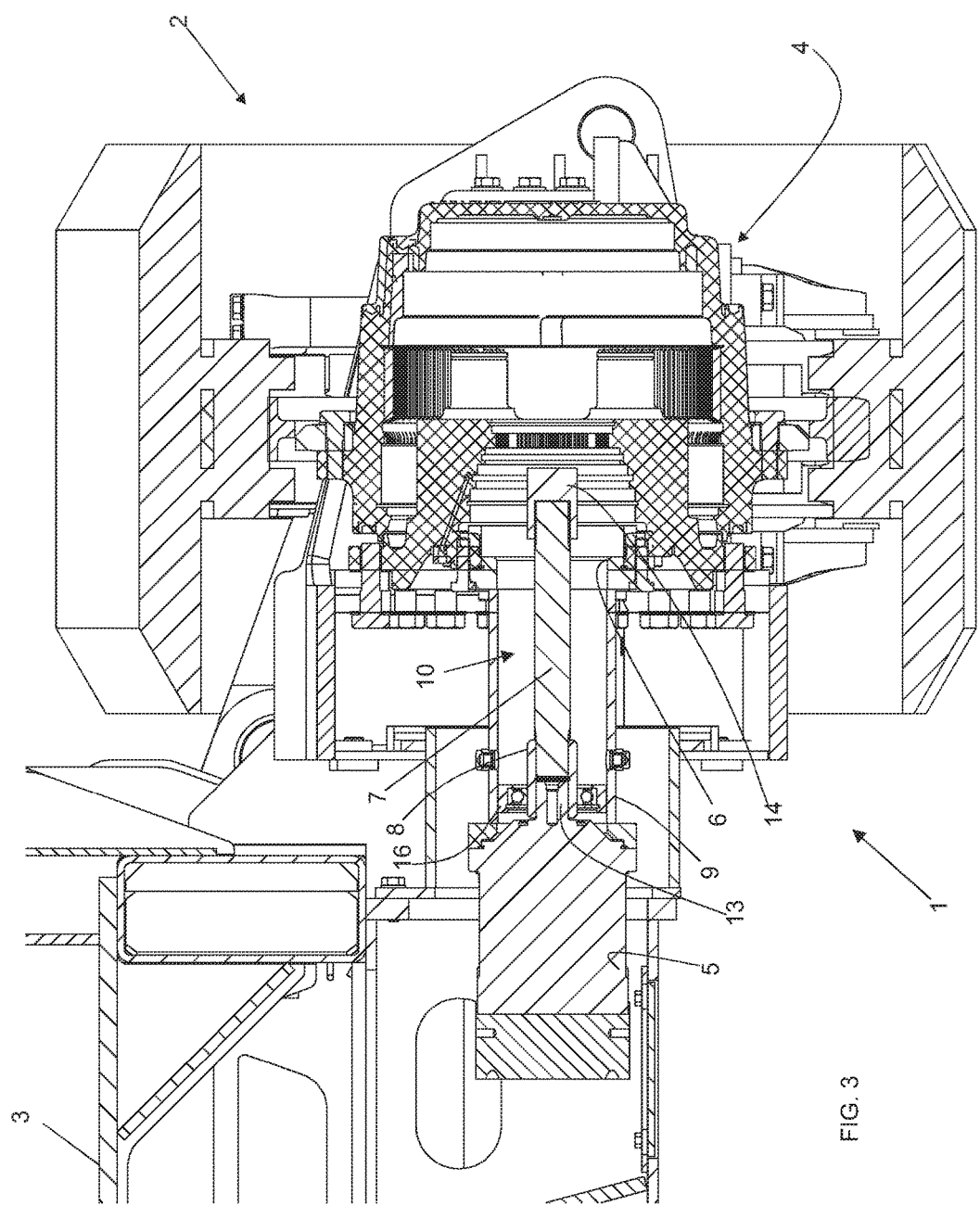

| | | | | |
|---|---|---|---|---|
| 3,969,950 A * | 7/1976 | Rau | ............... | B60K 17/14 |
| | | | | 180/305 |
| 4,043,226 A * | 8/1977 | Buuck | ............... | B60K 17/046 |
| | | | | 180/247 |
| 4,068,732 A | 1/1978 | Granryd | | |
| 4,213,514 A * | 7/1980 | Ehrlinger | ............... | B60K 17/14 |
| | | | | 180/247 |
| 4,330,051 A * | 5/1982 | Fukui | ............... | B60T 1/062 |
| | | | | 180/308 |
| 4,334,590 A * | 6/1982 | Plumb | ............... | B60K 17/046 |
| | | | | 180/247 |
| 4,588,322 A * | 5/1986 | Shoemaker | ............... | F16D 1/092 |
| | | | | 192/95 |
| 5,261,801 A * | 11/1993 | Stone | ............... | F16D 11/14 |
| | | | | 192/96 |
| 5,829,848 A | 11/1998 | Kelderman | | |
| 6,158,535 A | 12/2000 | Porubcansky et al. | | |
| 6,672,413 B2 * | 1/2004 | Moore | ............... | B62D 57/024 |
| | | | | 180/9.21 |
| 7,896,178 B2 * | 3/2011 | Davis | ............... | B66C 23/36 |
| | | | | 212/178 |
| 8,201,649 B2 * | 6/2012 | Andrus | ............... | B62D 55/104 |
| | | | | 180/9.1 |
| 8,794,358 B2 * | 8/2014 | Hansen | ............... | B62D 55/04 |
| | | | | 180/9.21 |
| 8,795,130 B2 * | 8/2014 | Forrest | ............... | F16D 11/14 |
| | | | | 192/69.43 |
| 2001/0025732 A1 | 10/2001 | Lykken et al. | | |
| 2014/0158440 A1 * | 6/2014 | Haar | ............... | B62D 55/04 |
| | | | | 180/9.21 |
| 2014/0338991 A1 * | 11/2014 | Hansen | ............... | B62D 55/04 |
| | | | | 180/9.21 |

OTHER PUBLICATIONS

European Search Opinion, dated Jan. 2017, from corresponding European Patent Application No. EP16186139.

* cited by examiner

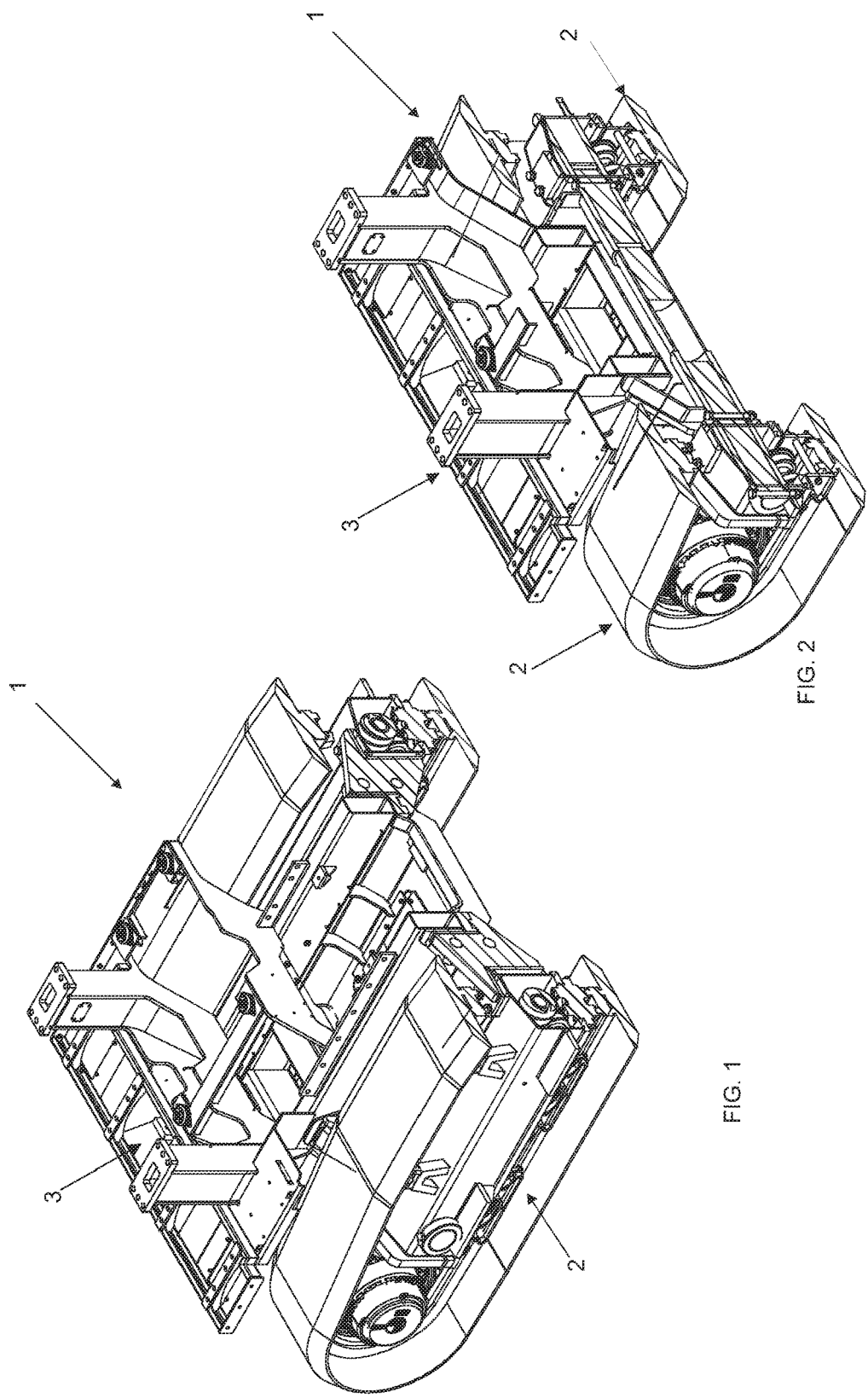

INDUSTRIAL VEHICLE WITH DEVICE FOR RELEASING THE UNDERCARRIAGES WITHOUT DISCONNECTING THE HYDRAULIC SYSTEM

FIELD OF THE INVENTION

The present invention refers to the field of agricultural machines and/or industrial crawler machine and more precisely relates to a system to facilitate the release of tracks undercarriages from the machine main body.

An example of application is in the pipe-laying machines, namely the apparatuses used in the activity of laying and installation of piping. Said devices are equipped with variable-length arms according to the needs of the site, and fitted with brackets for proper placement.

STATE OF THE ART

Know type excavators are constituted of a chassis or central frame unit to which are connected a pair of tracked undercarriages, suitable to allow the advancement of the structure and the vehicle in general.

These vehicles, besides a lower carriage of advancement, also are equipped with:
- An operator station (with steering control, two-way joystick with shift button, differential etc. . . . ),
- A power train,
- An electrical system,
- A hydraulic system,
- Appropriate equipment for pipe laying applications (block and hook with fixing mechanism, counterweights, extendable segmented, winches or winches controlled and hydraulically activated, with hook fastening mechanism)

The lower carriage (chassis) of the vehicle is constituted of a couple of crawler undercarriages, that includes a rear (drive) wheel and a front (idle) wheel, "load-bearing rollers" that allow to uniformly discharge the weight of the tractor on the ground, the supporters rollers that guide and support the track in the upper part, and the frame structure that connects and fastens the whole.

The driving rear wheel comprises a generally planetary gear unit (gearbox) on which is directly flanged a hydraulic motor; said piston motor is powered by the hydraulic circuit placed on the central chassis.

Usually each tracked is connected and attached to the main frame by means of flanged joints and bolted together so as to make their stable connection.

Systems for the release and easy attachment of the trucked undercarriages to the main body of the driving machine are known to the prior art. These systems avoid the high costs of transport, especially by sea, of the machines themselves.

Indeed, because of the overall dimensions of the undercarriages, the machines are considered special loads and require special measures that avoid transport through a normal goods container.

It follows thus in having high and sometimes unjustified added costs that affect also the cost itself of the machine sold, or the cost for the intervention on the spot with the same.

Known hooking systems are described in the documents U.S. Pat. No. 7,896,178 and PR2015A00019. In the latter document, in order to allow the rapid detachment of the undercarriages, it is provided that each crawler undercarriage is secured to the central chassis of the vehicle only by means of coupling and quick-release pins, such as those illustrated in FIGS. 1 and 2.

Whereas document U.S. Pat. No. 7,896,178, to facilitate disassembly of the pipe-laying machine, provides that each part crawler is provided with one or more perforated plates attachable to corresponding brackets of the frame track. In addition the system includes a corresponding hook.

In said documents is not expected any system to manage in a simple and functional hydraulic connections of the circuit that feeds the hydraulic piston engines; said motors are flanged directly on the planetary gears and installed both on the rear drive wheel of each trucked undercarriage that transmit motion and torque.

During the operations of detachment of said undercarriages the hydraulic motor that is directly flanged on the reducer, remains assembled to it, and hence integral with the undercarriages; it is therefore necessary to disconnect the hydraulic hoses from the piston hydraulic motors fitted to the undercarriage, being the hydraulic system installed on the central chassis.

Scopes and Advantages of the Invention

One object of the present invention is to make available to the technique an improved industrial vehicle with fast releasing device, for the release of tracks undercarriages without the disconnection of the hydraulic part, and with a solution which optimizes the technological performances and system costs while ensuring the possibility of a simple and quick release of the undercarriages.

These and other aims are achieved thanks to the characteristics of the invention showed in the independent claim 1. The dependent claims outline preferred and/or particularly advantageous aspects of the invention.

In particular, one aspect of the present invention makes available a device that allows you to answer the fundamental need to reduce the transportation costs, by allowing to stow in a shipping container both the main body of the vehicle (chassis or central unit body/frame) and the related crawler undercarriages, thanks to the possibility of quick-releasing them from the main body of the machine.

In accordance with one aspect of the invention, the hydraulic motor and the reduction gearbox unit are not directly connected, but interconnected through the interposition of at least one transmission device, so that due to the detachment of the tracked undercarriage from the chassis, the hydraulic motor is uncoupled from the transmission device and remains integral to the chassis, keeping its hydraulic connections intact, while the gearbox unit and the transmission unit remain attached to the undercarriage.

Thanks to this solution it is also possible to perform the mechanical detachment between the chassis and the crawled undercarriages without intervening on the hydraulic connections, in other words without disconnecting the hydraulic circuit of the motor power supply that transmit the motion and the torque to the drive wheels; in fact, such hydraulic motor are integral with the central chassis where the hydraulic system is installed.

Another aspect of the invention is to make available a solution that, allowing to maintain the hydraulic circuit system closed, it allows the use of appropriate standard tubing suitable to the characteristics of a closed circuit system.

Thanks to this solution the performances of the hydraulic system are also improved as there is no longer the need of quick couplings on the pipes; said quick couplings usually generate high concentrated pressure drops with consequent reduction of the hydraulic efficiency, and sometimes oil leaks especially when working with high pressures and high flow rates.

Said aims and advantages are all achieved by the device for the release of the crawler undercarriages without disconnection of the hydraulic system, object of the present invention, which is characterized by the claims.

DRAWINGS

This and other characteristics will emerge more clearly from the following description of some embodiments illustrated, purely by way of non-limiting examples in the accompanying drawing tables.

Figure 4:
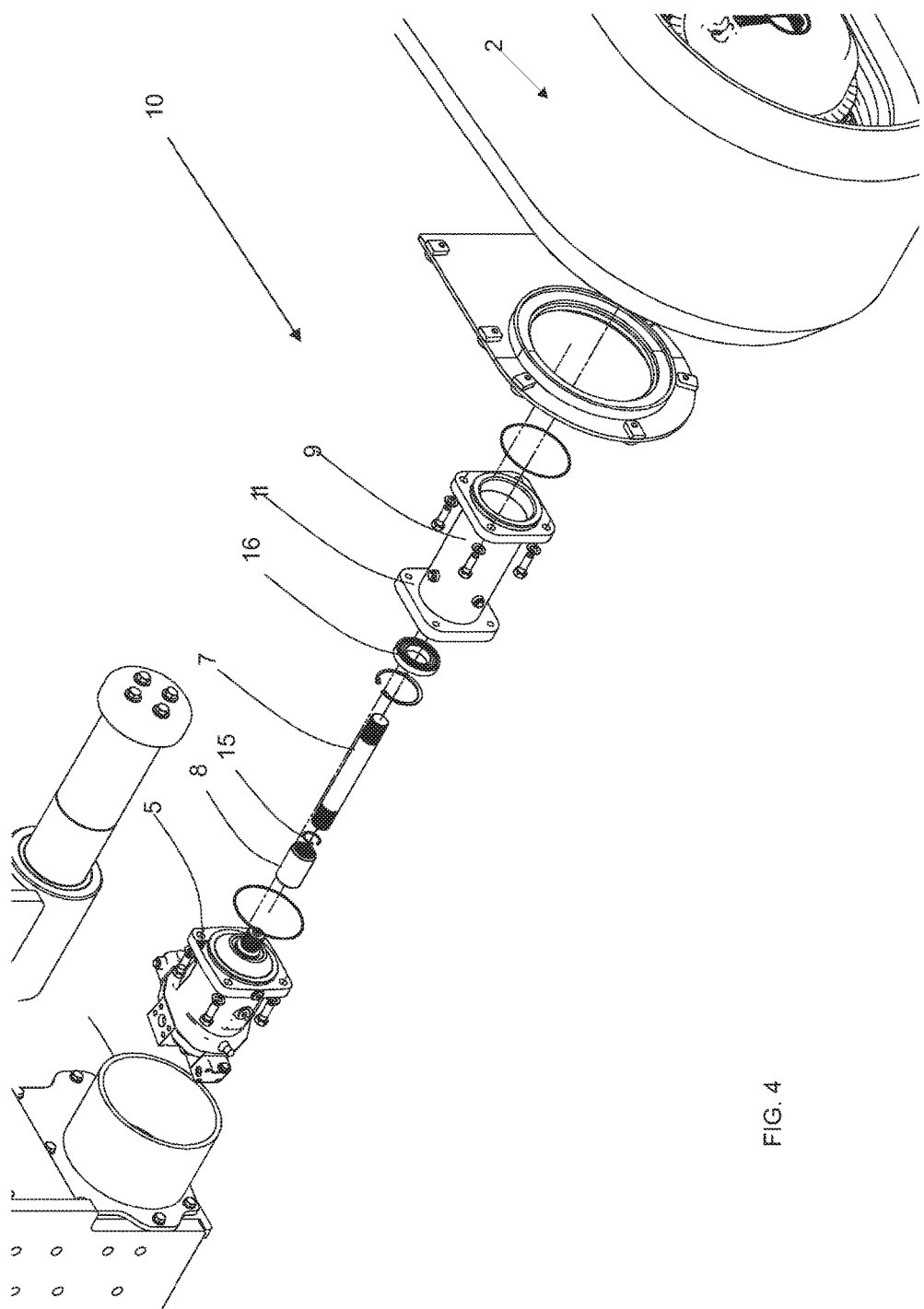
Figure 5:
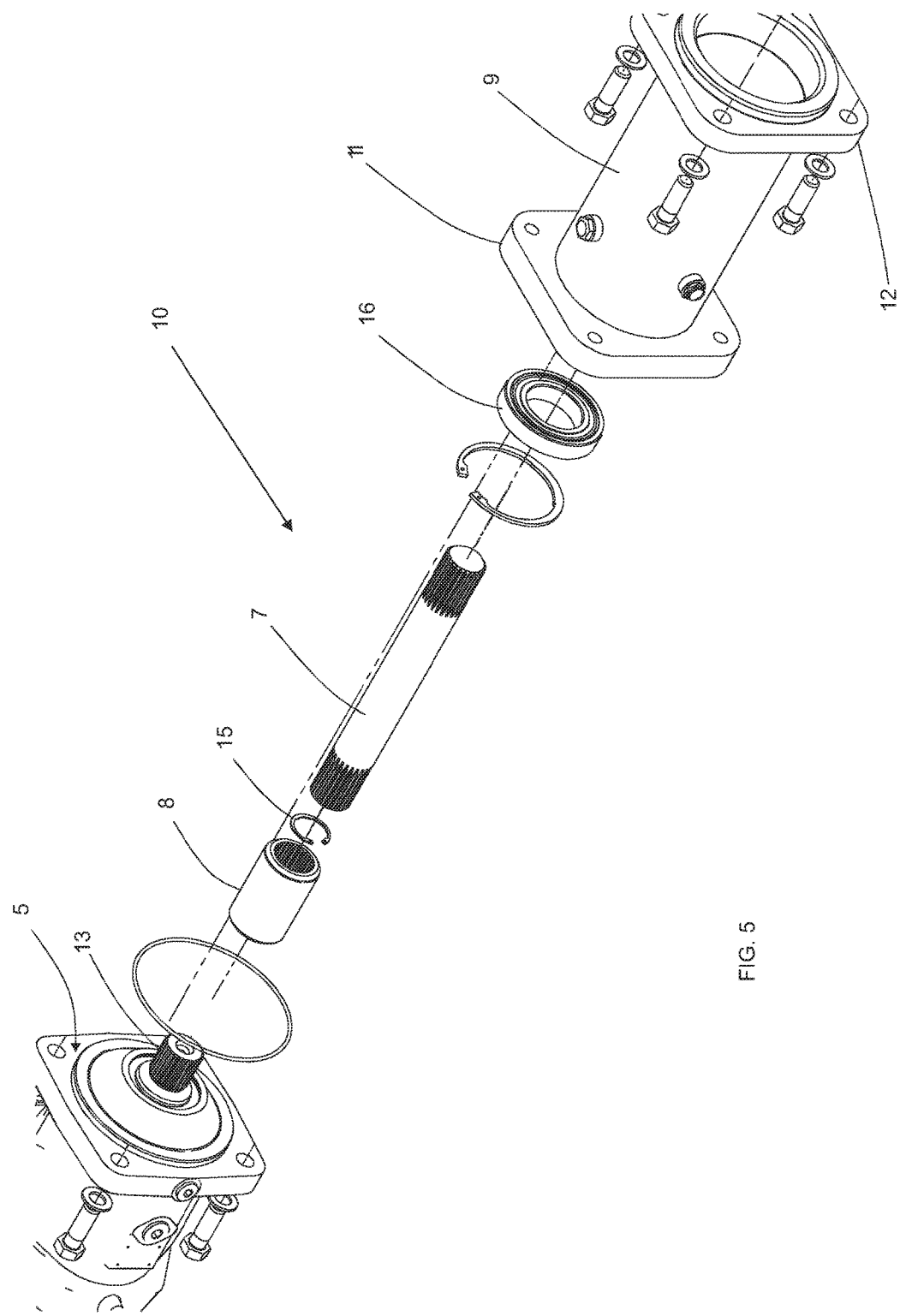

FIGS. 1 and 2 illustrate two portions of a machine tool, precisely an industrial vehicle with a device for the release of the undercarriages according to the prior art, FIG. 3: illustrates a section view of the chassis and crawler undercarriage, in correspondence with a driving wheel, according to the invention FIGS. 4 and 5: illustrate an exploded view of the components that contribute to realize the connection between the hydraulic motor and the gearbox of the hydraulic motor.

DETAIL OF THE INVENTION

With particular reference to the figures, referring number 1 indicates the supporting and movement's lower structure of an industrial vehicle (not shown).

Example of a vehicle's application is the so-called "Pipelayers" machines, an equipment used in the activity of laying and installation of piping.

The vehicle generally includes:
An operator post,
A power train,
An electrical system,
A hydraulic system,
Appropriate equipment for pipe laying applications,
A lower carriage of advancement, The object of the present invention is directed in the lower part of said vehicle, namely chassis and undercarriage.

Specifically, said lower part of the vehicle 1 is defined by a structure with a chassis 3 or central unit frame. A pair of crawler undercarriages 2 (also known as tracked undercarriages) are linked to said chassis 3 in order to allow the advancement of the structure and the vehicle in general.

Each of said crawler undercarriages 2 comprises a series of "load-bearing rollers" that allow to uniformly discharge the weight of the caterpillar tractor on the ground; said supporters rollers guide and support both the track shoes (at the top) and a pair of wheels, precisely a first front idle wheel and a second rear wheel driving 4.

Each of said crawler undercarriages 2 is driven by a hydraulic motor 5 which transmits motion and torque to a planetary gearbox 6 on which a drive wheel 4 is keyed;

Said hydraulic motor 5 is generally of the piston-type and is powered by a hydraulic system installed on the chassis 3.

The vehicle comprises hooking-release means for releasing the undercarriages 2 from said chassis 3.

The hydraulic motor 5 and the reduction gearbox 6 are not directly connected; in detail, the hydraulic motor 5 and the gearbox 6 are interconnected through the interposition of at least one transmission device 10.

Following the operations for releasing the crawler undercarriage 2 from the chassis 3, the hydraulic motor 5 is released from the transmission device 10 and remains integral to the chassis 3, keeping its hydraulic connections intact while the planetary gearbox 6 and the transmission device 10 remain integral to the undercarriage 2.

Said transmission device 10 comprises a shaft 7, a hub 8 and a hollow sleeve 9.

The shaft 7 and the hub 8 are adapted to transmit motion and driving torque from the hydraulic motor 5 to the gearbox 6.

The hollow sleeve 9, which accommodates the shaft 7 and the hub 8, connect the respective flanges of the hydraulic motor 5 and of the gearbox 6.

The hub 8 is hollow and internally bearing a grooved profile with radial toothing and dimensions suitable for matching with a grooved male shaft 13 of the hydraulic motor 5.

Said hub 8 on one side matches the male shaft 13 and on the other side matches the shaft 7.

The shaft 7 has a grooved profile with radial toothing at one end and dimensions suitable for mating with a grooved hollow shaft 14 of the gearbox 6; at the other end, it has a grooved profile with radial toothing and dimensions suitable for mating with the hub 8.

The hub 8 internally has a seat for a snap ring 15 which serves as abutment for the correct positioning of the shaft 7.

By the shaft 7 and hub 8 the torque is transmitted from the hydraulic motor 5 to the gearbox 6. Being the hub 8 grooved, in addition to transmit the torque it allows to easily remove the male shaft 13 of the hydraulic motor 5.

Hydraulic motor 5 and gearbox 6 are connected also by the hollow sleeve 9 which bears two flanges 11, 12 at the ends; the flange 11 has dimensions and drilling suitable for being coupled and bolted to the flange of the hydraulic motor 5; the flange 12 has dimensions and drilling suitable for being coupled and bolted to the flange of the gearbox 6.

The distance between the two flanges and thereby the length of the hollow sleeve 9 is defined by the length of the shaft 7.

The hollow sleeve 9 internally bears a seat for housing at least one bearing 16 adapted to support the sleeve 8 and the shaft 7.

It should be appreciated that the apparatus and methods of the present invention are capable of being incorporated in the form of a variety of embodiments, only a few of which have been illustrated and described above.

For example, according to another aspect of the invention shaft 7 and hub 8 may be welded together or formed integrally instead of being assembled.

So, while an embodiment of the present invention has been described herein, those with skill in this art will recognize changes, modifications, alterations and the like which still shall come within the spirit of the inventive concept, and such are intended to be included within the scope of the invention as expressed in the following claims.

When it becomes necessary to perform the release of the crawler undercarriages 2 from the central chassis 3, for example to facilitate the transportation, the steps are the following:

disconnecting the flange of the hydraulic motor 5 from the flange 11 of the hollow sleeve 9 to which it is bolted;
pulling the shaft 13 of the hydraulic motor 5 from the hub 8 splined.

In this way, the motor 5 remains attached to the chassis 3 which is equipped with suitable means to support it; since to the chassis 3 is also integral the hydraulic system, it is not necessary disconnections of the circuit that in this way remains closed.

By the term of "crawler or tracked undercarriages" must be intended both classic-iron tracks and rubber-band tracks, for example the ones used in excavators, and dump truck.

The invention claimed is:

1. An industrial vehicle, comprising:
   at least one structure with a chassis and a pair of crawler undercarriages, each of which is driven by a hydraulic motor which transmits motion and torque to a planetary gearbox on which a drive wheel is keyed; and hooking-release means for releasing the crawler undercarriages from said chassis; wherein
   the hydraulic motor and the planetary gearbox are interconnected through the interposition of at least one transmission device;
   wherein said at least one transmission device is coaxial to the hydraulic motor and the planetary gearbox; and wherein
   following the operations for releasing the crawler undercarriage from the chassis, the hydraulic motor is released from the at least one transmission device and remains integral to the chassis, keeping its hydraulic connections intact while the planetary gearbox and the at least one transmission device remain integral to the crawler undercarriage.

2. The industrial vehicle according to claim 1, wherein the at least one transmission device comprises a shaft, a hub and a hollow sleeve; the shaft and the hub being adapted to transmit motion and driving torque from the hydraulic motor to the gearbox, and wherein
   the hollow sleeve, which accommodates the shaft and the hub, connect respective flanges of the hydraulic motor and of the gearbox.

3. The industrial vehicle according to claim 2, wherein the hub is hollow and internally bearing a grooved profile with radial toothing and dimensions suitable for matching with a grooved male shaft of the hydraulic motor.

4. The industrial vehicle according to claim 3, wherein the hub internally has a seat for a snap ring which serves as an abutment for the correct positioning of the shaft.

5. The industrial vehicle according to claim 3, wherein being grooved, the hub allows removing the shaft of the hydraulic motor such that said motor remains integral to the chassis and supported thereby.

6. The industrial vehicle according to claim 2, wherein the shaft has a grooved profile with radial toothing at one end and dimensions suitable for mating with a grooved hollow shaft of the gearbox, the shaft having at an other end, a grooved profile with radial toothing and dimensions suitable for mating with the hub.

7. The industrial vehicle according to claim 2, wherein hollow sleeve bears two flanges at the ends, one with dimensions and drilling suitable for being coupled and bolted to the flange of the hydraulic motor and one with dimensions and drilling suitable for being coupled and bolted to the flange of the gearbox; the distance between the two flanges and thereby the length of the hollow sleeve being defined by the length of the shaft.

8. The industrial vehicle according to claim 2, wherein the hollow sleeve internally bears a seat for housing at least one bearing adapted to support the sleeve and the shaft.

9. An industrial vehicle, comprising:
   at least one structure with a chassis and a pair of crawler undercarriages, each of which is driven by a hydraulic motor which transmits motion and torque to a planetary gearbox on which a drive wheel is keyed; and
   hooking-release means for releasing the crawler undercarriages from said chassis,
   wherein the hydraulic motor and the planetary gearbox are interconnected through the interposition of at least one transmission device,
   wherein following the operations for releasing the crawler undercarriage from the chassis, the hydraulic motor is released from the at least one transmission device and remains integral to the chassis, keeping its hydraulic connections intact while the planetary gearbox and the at least one transmission device remain integral to the crawler undercarriage,
   wherein the at least one transmission device comprises a shaft, a hub and a hollow sleeve; the shaft and the hub being adapted to transmit motion and driving torque from the hydraulic motor to the gearbox,
   wherein the hollow sleeve, which accommodates the shaft and the hub, connect respective flanges of the hydraulic motor and of the gearbox, and
   wherein the hub is hollow and internally bearing a grooved profile with radial toothing and dimensions suitable for matching with a grooved male shaft of the hydraulic motor.

10. The industrial vehicle according to claim 9, wherein the hub internally has a seat for a snap ring which serves as an abutment for the correct positioning of the shaft.

11. The industrial vehicle according to claim 9, wherein being grooved, the hub allows removing the shaft of the hydraulic motor such that said motor remains integral to the chassis and supported thereby.

12. An industrial vehicle, comprising:
   at least one structure with a chassis and a pair of crawler undercarriages, each of which is driven by a hydraulic motor which transmits motion and torque to a planetary gearbox on which a drive wheel is keyed; and
   hooking-release means for releasing the crawler undercarriages from said chassis,
   wherein the hydraulic motor and the planetary gearbox are interconnected through the interposition of at least one transmission device,
   wherein following the operations for releasing the crawler undercarriage from the chassis, the hydraulic motor is released from the at least one transmission device and remains integral to the chassis, keeping its hydraulic connections intact while the planetary gearbox and the at least one transmission device remain integral to the crawler undercarriage,
   wherein the at least one transmission device comprises a shaft, a hub and a hollow sleeve; the shaft and the hub being adapted to transmit motion and driving torque from the hydraulic motor to the gearbox,
   wherein the hollow sleeve, which accommodates the shaft and the hub, connect respective flanges of the hydraulic motor and of the gearbox, and
   wherein the shaft has a grooved profile with radial toothing at one end and dimensions suitable for mating with a grooved hollow shaft of the gearbox, the shaft having at another end, a grooved profile with radial toothing and dimensions suitable for mating with the hub.

* * * * *